United States Patent [19]

Rasor et al.

[11] Patent Number: 4,988,026
[45] Date of Patent: Jan. 29, 1991

[54] DISCRETELY ADJUSTABLE SUPPORT RAIL FOR LUGGAGE CARRIERS

[75] Inventors: William Rasor, Goodells; Craig A. Stapleton, Port Huron, both of Mich.

[73] Assignee: Huron/St. Clair Incorporated, Port Huron, Mich.

[21] Appl. No.: 351,986

[22] Filed: May 15, 1989

[51] Int. Cl.⁵ .............................................. B60R 9/00
[52] U.S. Cl. ................................... 224/321; 224/326; 224/316
[58] Field of Search ............... 224/326, 309, 325, 321, 224/316; 211/192; 410/104, 105, 150, 132, 139, 113, 126, 130; 296/180.1, 90

[56] References Cited

U.S. PATENT DOCUMENTS

| Re. 26,539 | 3/1969 | Bott . | |
|---|---|---|---|
| 3,719,313 | 3/1973 | Tischler . | |
| 3,776,437 | 12/1973 | Carney | 224/321 |
| 4,323,182 | 4/1982 | Bott . | |
| 4,406,386 | 9/1983 | Rasor et al. | 224/325 |
| 4,432,478 | 2/1984 | Bott . | |
| 4,440,333 | 4/1984 | Bott . | |
| 4,448,337 | 5/1984 | Cronce . | |
| 4,469,261 | 9/1984 | Stapleton et al. . | |
| 4,487,348 | 12/1984 | Mareydt . | |
| 4,500,020 | 2/1985 | Rasor . | |
| 4,588,117 | 5/1986 | Bott . | |
| 4,768,691 | 9/1988 | Stapleton . | |

FOREIGN PATENT DOCUMENTS 3614740  5/1987  Fed. Rep. of Germany ...... 224/309

Primary Examiner—Linda J. Sholl
Attorney, Agent, or Firm—Edgar A. Zarins; Malcolm L. Sutherland

[57] ABSTRACT

A vehicle luggage carrier having at least one adjustable cross rail mounted to longitudinal side rails. The cross rail is discretely adjustable with respect to a plurlaity of spaced apart openings extending substantially the length of the side rails. A rear cross rail may be similarly adjustable or can form an extension of the side rails and therefore fixed as a rear spoiler. The cross rails are constructed so that they may be nested together to form a single spoiler. A cam locking mechanism extending through an opening in the side rail secures the cross rail in position.

13 Claims, 2 Drawing Sheets

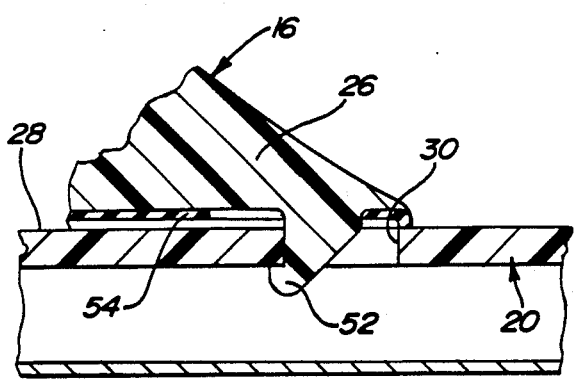
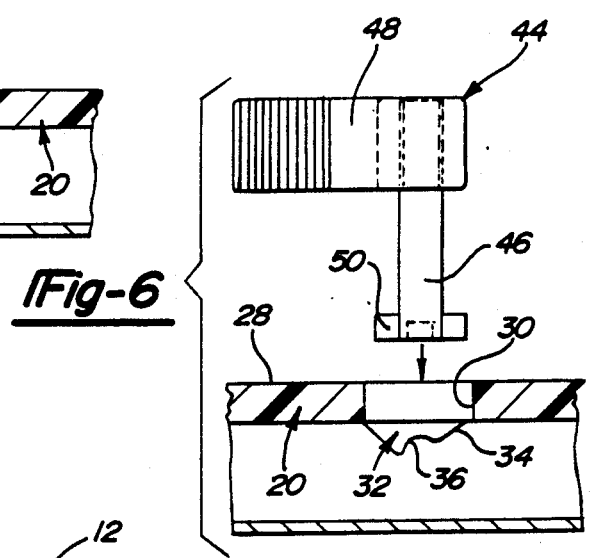
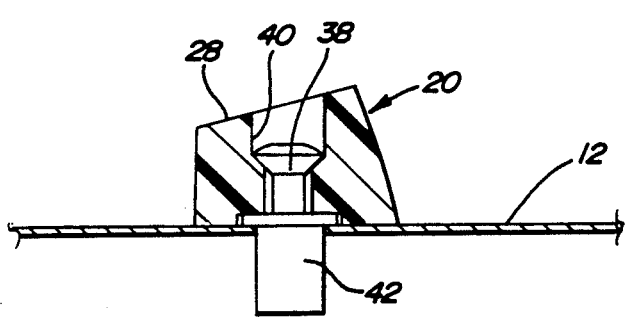
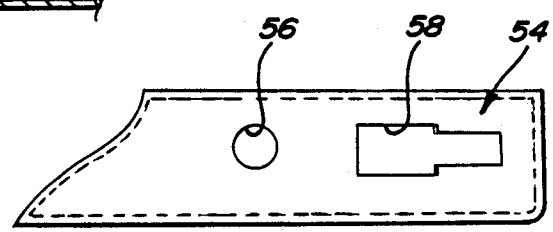
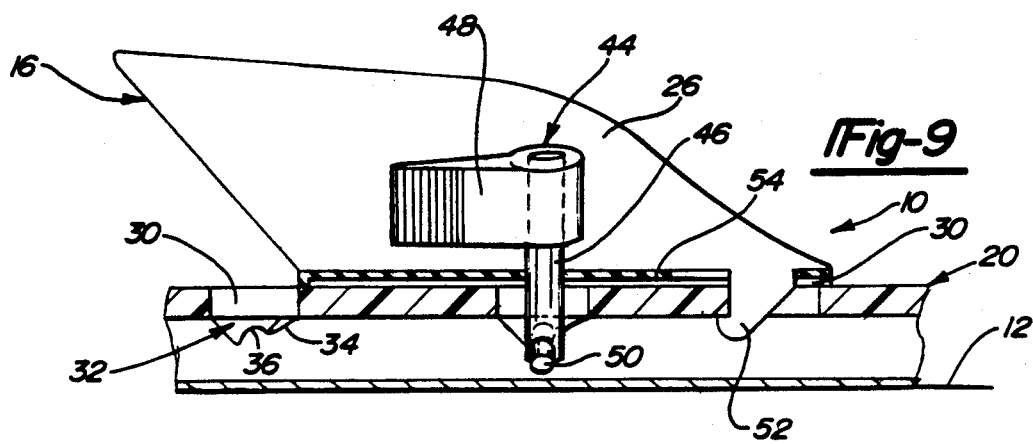

DISCRETELY ADJUSTABLE SUPPORT RAIL FOR LUGGAGE CARRIERS

BACKGROUND OF THE INVENTION

I. Field of the Invention

This invention relates to luggage carriers having adjustable rails and, in particular, to cross rails of a carrier which are discretely adjustable along longitudinal side rails mounted to a vehicle.

II. Description of the Prior Art

Early vehicle luggage carriers consisted of a substantially rectangular frame mounted in spaced-apart relationship to the vehicle surface. Four or more stanchions were used to support the frame above the surface to capture the luggage or other articles therewithin and to provide means for tying down the articles. However, such fixed frame carriers reduced the aesthetics and aerodynamics of the vehicle when not in use. As a result, carriers with adjustable or removable rails were developed such that different size loads could be accommodated and the carrier could be collapsed or removed when not in use. These adjustable carriers utilize a fixed side rail to which is slidably mounted a cross rail. The cross rail may include tightening means for securing the rail in a particular position. Rotatable knobs, cam levers and clamps have all been used to secure the rail along the roof.

The continuously or slidably adjustable carrier rails had the disadvantage that after several settings the release mechanism become stripped, particularly when plastic materials were used as is the industry norm. Moreover, the rail could not always be precisely aligned particularly if an individual has to adjust both ends of the rail. This resulted in an awkward appearance of the carrier.

SUMMARY OF THE PRESENT INVENTION

The present invention overcomes the disadvantages of the prior known carriers by providing a rail which is discretely adjustable along longitudinal side rails wherein alignment of the rail can always be maintained and sliding movement of the stanchions is prevented by the discrete mounting positions.

The article carrier according to a preferred embodiment of the present invention generally comprises a pair of side rails mounted to the vehicle surface and at least one discretely adjustable cross rail attached to the side rails. The carrier may include a fixed rear cross rail forming a part of the side rails and acting as a rear spoiler while the front rail is adjustable along the carrier to accommodate different loads. The side rails include a plurality of spaced apart apertures for receiving the retaining assembly of the cross rail. In a preferred embodiment, the cross rail stanchions include a locking hook adapted to be received in one aperture and a cam locking mechanism adapted to be received in another aperture beneath the stanchion. Once the hook has been positioned in one of the apertures the cam lock mechanism can be positioned and locked into place to secure the cross rail. The cross rail is discretely adjustable along substantially the full length of the side rails to accommodate the particular load and can be stored in resting relation with the rear cross rail when the carrier is not being used thereby forming an enlarged rear spoiler.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 5 is a partial cross-sectional view of the discretely adjustable support secured to the side rail;

FIG. 6 is an exploded view of the cam locking mechanism of the present invention;

FIG. 7 is a cross-sectional perspective of a surface mounted side rail;

FIG. 8 is a plan view of the support rail gasket; and

FIG. 9 is a side cross-sectional perspective of the discretely adjustable support rail mounted to the side rail.

DETAILED DESCRIPTION OF A PREFERRED EMBODIMENT OF THE PRESENT INVENTION

Figure 1:
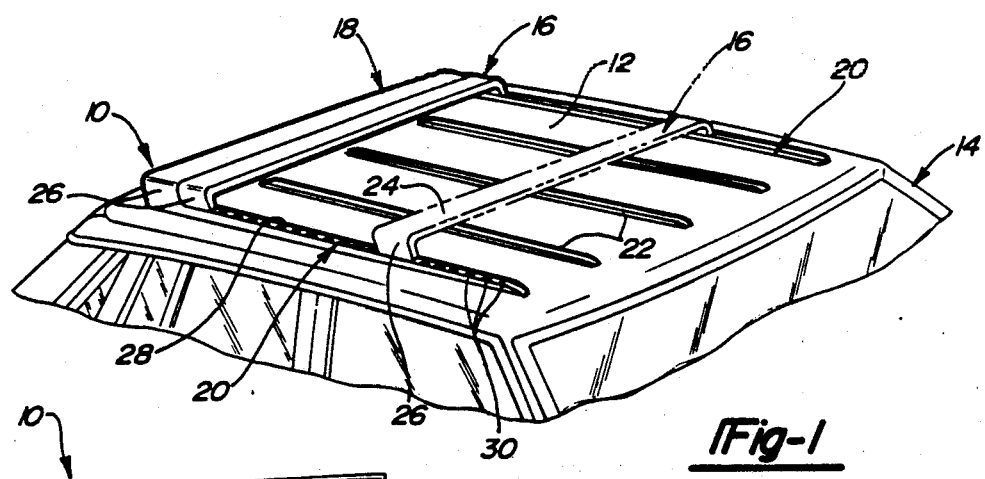
FIG. 1 is an elevated perspective view of a vehicle having the luggage carrier embodying the present invention mounted thereto.

Referring first to FIG. 1, there is shown a vehicle article carrier 10 embodying the present invention mounted to a roof surface 12 of a vehicle 14. The carrier 10 includes at least one movable cross rail 16 which can be adjusted longitudinally along the length of the carrier into a plurality of discrete positions to accommodate different load configurations or into nesting relation with a rear cross rail 18 to form an enlarged rear spoiler (phantom) when the carrier 10 is not being used. Although a preferred embodiment of the carrier 10 utilizes a stationary rear cross rail 18 and a discretely adjustable front cross rail 16, it should be understood that both cross rails may be adjustable along the carrier 10 or more than one adjustable rail 16 may be utilized with the stationary rail 18. The configuration and operation of the carrier 10 of the present invention provides flexibility in accommodating different loads and a storage position which improves the aerodynamics and aesthetics of the vehicle 14.

Figure 4:
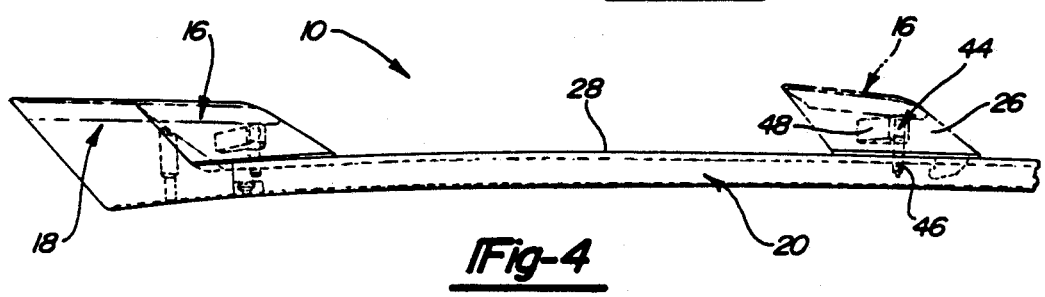
FIG. 4 is a side plan view of the luggage carrier showing the support rail in its stored positions and is operative position.

The article carrier 10 of the present invention preferably includes a pair of side rails 20 mounted flush with the vehicle surface 12 and a plurality of longitudinal slats 22 which act as a load-bearing surface for the load retained by the carrier 10. The stationary cross rail 18 forms an end piece of the outer side rails 10 as the cross rail 18 extends rearwardly from the side rails 20 acting as a rear spoiler for the vehicle 14 as well as a cross rail 18 for the carrier 10. The cross rails 16 and 18 preferably comprise a rail member 24 elevated in space relation to the vehicle surface 14 by support stanchions 26. The elevated cross rails 16 and 18 act to prevent shifting of the load positioned therebetween on the load bearing surface. The cross rails 16 and 18 are configured and positioned so as to allow nesting of one cross rail with the other, preferable the movable cross rail 15 against the stationary cross rail 18 as shown in FIGS. 1, 2 and 4.

Figure 2:
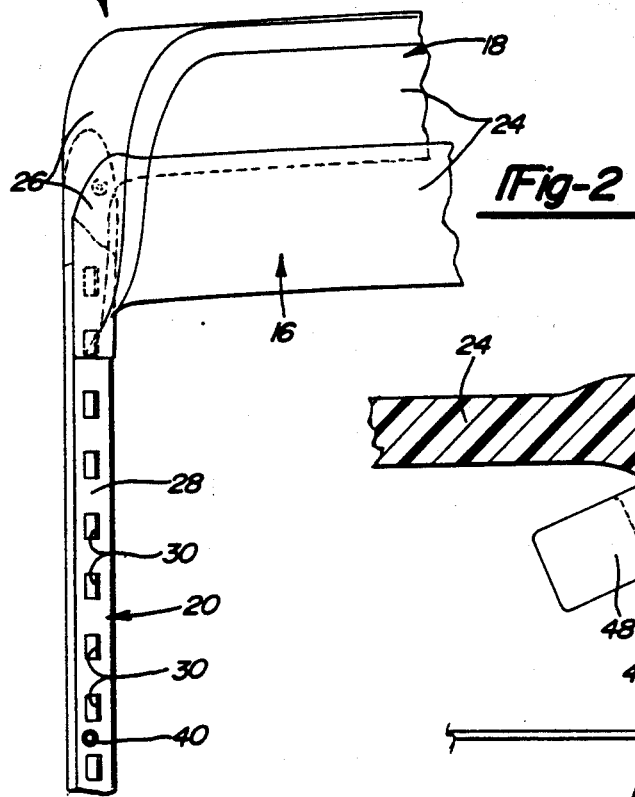
FIG. 2 is a partial top plan view of the luggage carrier of the present invention with the support rails nested in their rearward position.
Figure 3:
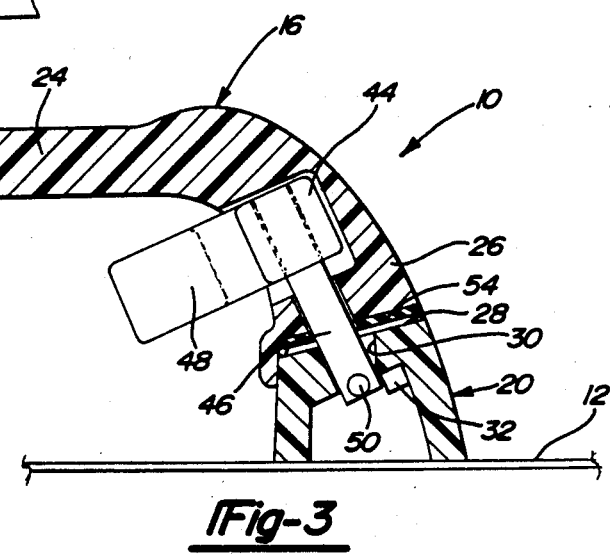
FIG. 3 is a cross-sectional view of the discretely adjustable support rail mounted to a side rail.

As best shown in FIGS. 1 through 3, the side rails 20 mounted to the vehicle surface 12 include an upper mounting surface 28 extending substantially the length of the side rail 20. Formed in the upper surface 28 are a plurality of apertures 30 spaced along the side rails 20 and defining the discrete positions of the adjustable cross rail 16. Associated with each aperture 30 is a camming ramp 32 for selectively receiving the locking means of the adjustable cross rail 16 as will be subsequently described. The camming ramp 32 is formed within the interior of the side rail 20 to one side of each of the apertures 30. The camming ramp 32 includes a sloped ramp surface 34 and a notch 36 which lockingly receives the locking means of the adjustable cross rail 16. The side rails 20 are secured to the vehicle surface 12 by fasteners 38 extending through openings 40 formed through the side rails 20 to engage a well nut 42 as shown in FIG. 7.

Referring now to FIGS. 3, 5, 6 and 9, disposed within the support stanchions 26 are means 44 for locking the cross rail 15 in position along the side rails 20. The locking means 44 includes a cam shaft 46 axially connected to a cam lever 48. Formed at the end of the cam shaft 46 is a locking pin 50 disposed perpendicular to the cam shaft 46. The cam shaft 46 extends downwardly from the bottom of the stanchion 26 while the cam lever 48 is accessible along the side of the stanchion 26. The cam lever 48 is pivotable between a stored/locked position wherein the lever 48 forms a part of the outer wall of the stanchion 26 and an unlocked position wherein the lever 48 extends from the stanchion 26 as shown in FIG. 3. As the lever 48 is pivoted, the camshaft 46 will be simultaneously rotated between a locked and an unlocked position as will be subsequently described. Also formed on the underside of the support stanchion is an engagement hook 52. As shown in FIGS. 5 and 9, the engagement hook 52 is integrally formed with the stanchion 26 and depends downwardly from the underside of the stanchion 26.

Both the locking means 44 and the engagement hook 52 are adapted to be received within the apertures 30 of the side rails 20 to secure the cross rail 16. In a preferred embodiment of the invention, the cam shaft 46 and hook 52 are space apart a distance equal to the spacing between apertures 30 so that they may be received within adjacent apertures 30 of the side rails 20. With the locking means 44 and hook 52 positioned within the side rails 20, the support stanchion 26 will rest on the surface 28 of the side rail 20. Mounted to the underside of the support stanchion 26 such that it will be disposed between the body of the stanchion 26 and the mounting surface 28 of the side rail 20 is a compression gasket 54 (FIG. 8). The gasket 54 has a configuration which substantially matches the underside of the stanchion 26 including an opening 56 through which the cam shaft 46 extends and a slot 58 through which the engagement hook 52 extends. The compression of the gasket 54 between the stanchion 26 and the side rail 20 maintains locking pressure on the cam locking means 44 as will be subsequently described.

Operation of the present invention allows discrete adjustment of the cross rail 16 along the side rails 20 such that alignment of the adjustable rail 16 is always maintained while displacement of the cross rail 16 is prevented even if the locking means is non-operational. When the desired position of the cross rail 16 is determined, the cam shaft 46 and engagement hook 52 are positioned within the appropriate apertures 30 of the side rails 20 until the gasket 54 rests against the mounting surface 28. In order to place the cam shaft 46 and pin 50 through the aperture 30, the locking means 44 must be in the unlocked position such that the pin 50 is disposed parallel to the side rail 20. Since in the preferred embodiment, the apertures 30 are rectangular with one dimension greater than the other, the pin 50 will also be disposed parallel to the larger dimension of the aperture 30 in order to travel therethrough. Once the cross rail 16 is mounted the side rails 20, the stanchions 26 are shifted longitudinally until the hook 52 extends beneath the upper wall 38 of the side rail 20 as shown in FIG. 5. To secure the cross rail 16, the cam handle 48 is pivoted to rotate the cam shaft 46 until the pin 50 travels along the sloped surface 34 of the camming ramp 32 into the notch 36. Simultaneously, the support stanchion 26 will be drawn downwardly compressing the gasket 54 between the stanchion 26 and the side rail 20. The compression force of the gasket 54 will create an upward force thereby maintaining the locking pin 50 within the notch 36 of the camming ramp 32. When it becomes necessary to reposition the adjustable cross rail 16, the cam lever 48 is simply pivoted away from the stanchion 26 withdrawing the locking pin 50 from camming ramp 32 allowing the cross rail 16 to be lifted from the side rails 20. The rail 16 can then either be repositioned along the length of the side rails 20 or in nesting relationship with the fixed rail 18 which forms an end piece of the side rails 20.

The foregoing detailed description has been given for clearness of understanding only and no unnecessary limitations should be understood therefrom as some modifications will be obvious to those skilled in the art without departing from the scope and spirit of the appended claims:

We claim:

1. An article carrier mountable to a surface of a vehicle, said carrier comprising:

a pair of side rails mounted to the vehicle surface, said side rails having an upper mounting surface, said upper surface including a plurality of spaced apart apertures extending substantially the length of said side rails and defining a plurality of discrete mounting positions;

at least one movable cross rail mounted to said side rails, said at least one cross rail discretely adjustable along said side rails such that said at least one cross rail may be located in one of said discrete mounting positions along said side rails; and means for releasably locking said at least one cross rail in one of said discrete positions along said side rails, said locking means including a cam handle connected to a cam shaft, said cam shaft extending into one of said apertures of said mounting surface defining said one discrete position, said cam shaft rotatable into locking engagement with said side rail upon pivotable movement of said cam handle.

2. The article carrier as defined in claim 1 wherein said side rails include a stationary cross rail integrally formed and extending from the rearward end of said side rails, said at least one discretely adjustable cross rail movable into nesting relation with said stationary cross rail to form a rear spoiler.

3. The article carrier as defined in claim 1 wherein said at least one cross rail comprises a rail member and a pair of support stanchions mounted to the ends of said rail member, said cam shaft of said means for releasably locking said at least one cross rail extending downwardly from within said stanchion through the underside of said support stanchions into apertures disposed beneath said stanchions for releasable engagement with said side rails, said cam lever pivotably disposed within said support stanchions for axial rotation of said cam shaft.

4. The article carrier as defined in claim 3 wherein said support stanchions include an engagement hook depending downwardly from the underside of said stanchion, said engagement hook removably received within a first aperture and said locking means removably received within a second aperture of said side rail disposed beneath said support stanchion.

5. The article carrier as defined in claim 4 wherein each of said apertures of said side rails include a camming ramp to receive said locking means of said support stanchion extending into said aperture of said side rails, said locking means including a cam handle connected to a cam shaft, said cam shaft selectively rotatable into engagement with said camming ramp upon pivotable movement of said cam handle to releasably secure said at least one cross rail relative to said side rails.

6. The article carrier as defined in claim 3 wherein said side rails are mounted flush with the vehicle surface, said stanchions supporting said rail member in spaced apart relation to the vehicle surface when mounted to the upper surface of said side rails.

7. An article carrier mountable to a surface of a vehicle, said carrier comprising:
    a pair of longitudinally extending side rails mounted flush to the vehicle surface, said side rails including an upper mounting surface having a plurality of spaced apart apertures extending substantially the length of said side rails and defining a plurality of discrete mounting positions;
    a stationary rear cross rail mounted to and extending from the rearward ends of said side rails;
    a movable front cross rail mounted to said side rails and discretely adjustable along said plurality of apertures formed in said upper mounting surface of said side rails such that said movable cross rail may be located at any of said discrete mounting positions, said movable cross rail including a rail member and a pair of support stanchions; and
    means for releasably locking said movable cross rail in one of said discrete mounting positions along said side rails, said locking means including a cam handle connected to a cam shaft extending from the underside of said support stanchions into one of said apertures of said side rail disposed beneath said movable cross rail whereby said movable cross rail must be lifted from said mounting surface of said side rails to withdraw said cam shaft of said locking means from said aperture and position said movable cross rail at another discrete mounting position, said cam handle pivotably disposed within said support stanchions to selectively rotate said cam shaft between a locked and a release position.

8. The article carrier as defined in claim 7 wherein said stationary cross rail and said movable cross rail each comprise a rail member and a pair of support stanchions, said stanchions supporting said rail member in spaced apart relation to said vehicle surface.

9. The article carrier as defined in claim 8 wherein said support stanchions of said movable cross rail have said locking means and an engagement hook depending downwardly from the bottom thereof, said engagement hook removably received within a first aperture and said cam shaft of said locking means removably received within a second aperture of said side rail disposed beneath said support stanchions.

10. The article carrier as defined in claim 9 wherein each of said apertures of said side rails include a camming ramp to lockingly receive a locking pin attached to said cam shaft of said locking means, said locking pin of said cam shaft selectively engageable with said camming ramp upon rotation of said cam handle and cam shaft within said support stanchion to releasably secure said movable cross rail to said side rails.

11. The article carrier as defined in claim 8 wherein said discretely adjustable front cross rail is movable into nesting relation with said stationary rear cross rail.

12. An article carrier mountable to a surface of a vehicle, said carrier comprising:
    a pair of side rails mounted to the vehicle surface, said side rails having an upper mounting surface, said upper mounting surface including a plurality of spaced apart apertures extending substantially the length of said side rails and defining a plurality of discrete mounting positions;
    at least one movable cross rail including a rail member and a pair of support stanchions connected to the ends of said rail member and mounted to said upper mounting surface of said side rails, said at least one cross rail discretely adjustable along said side rails such that said at least one cross rail may be located in one of said discrete mounting positions along said side rails; and
    means for releasably locking said at least one cross rail in one of said discrete positions along said side rails, said locking means disposed within said support stanchions and including a cam handle connected to a cam shaft having a locking pin attached thereto, said cam handle pivotably disposed within said support stanchion to selectively rotate said cam shaft between a locked and a release position; said support stanchions having an engagement hook depending downwardly from the underside thereof, said engagement hook removably received within a first aperture of said mounting surface disposed beneath said support stanchion and said cam shaft and locking pin extending from the underside of said support stanchion into a second aperture of said mounting surface disposed beneath said support stanchion, said apertures of said side rails including a camming ramp to lockingly receive said locking pin of said cam shaft upon rotation of said cam handle and cam shaft to said locked position.

13. The article carrier as defined in claim 12 wherein said side rails include a stationary rear cross rail integrally formed with and extending rearwardly from said side rails, said at least one movable cross rail adjustable into nesting relation with said rear cross rail.

* * * * *